United States Patent
Togawa

(10) Patent No.: US 11,125,917 B2
(45) Date of Patent: Sep. 21, 2021

(54) LIGHT-SHADING MATERIAL FOR OPTICAL DEVICE

(71) Applicant: SOMAR CORPORATION, Tokyo (JP)

(72) Inventor: Yui Togawa, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 60 days.

(21) Appl. No.: 16/333,416

(22) PCT Filed: Sep. 13, 2017

(86) PCT No.: PCT/JP2017/033137
§ 371 (c)(1),
(2) Date: Mar. 14, 2019

(87) PCT Pub. No.: WO2018/052044
PCT Pub. Date: Mar. 22, 2018

(65) Prior Publication Data
US 2019/0257981 A1    Aug. 22, 2019

(30) Foreign Application Priority Data

Sep. 16, 2016  (JP) .............................. JP2016-182133

(51) Int. Cl.
| | | |
|---|---|---|
| *G02B 1/11* | (2015.01) | |
| *G02B 5/02* | (2006.01) | |
| *B32B 7/02* | (2019.01) | |

(52) U.S. Cl.
CPC ............... *G02B 1/11* (2013.01); *B32B 7/02* (2013.01); *G02B 5/0226* (2013.01)

(58) Field of Classification Search
None
See application file for complete search history.

(56) References Cited

U.S. PATENT DOCUMENTS

| | | | |
|---|---|---|---|
| 2008/0254256 A1* | 10/2008 | Abe ..................... | B32B 38/0008 428/141 |
| 2010/0097705 A1* | 4/2010 | Furui ................... | G02B 5/0278 359/599 |

(Continued)

FOREIGN PATENT DOCUMENTS

| | | |
|---|---|---|
| CN | 103460080 B | 7/2015 |
| JP | 1164703 A | 3/1999 |

(Continued)

OTHER PUBLICATIONS

Taiwan Office Action dated Jun. 5, 2020 in counterpart Taiwan application 106131617, 3 pages.

(Continued)

*Primary Examiner* — Derek S. Chapel
(74) *Attorney, Agent, or Firm* — Juan Carlos A. Marquez; Marquez IP Law Office, PLLC

(57) ABSTRACT

A light-shading member for an optical device which has excellent reflection preventing performance can be manufactured by a simple process and can be applied to an optical device which is small and thin. Based on JIS B0601: 2001, the arithmetical mean deviation of the assessed profile Ra of the surface of the light-shading member for an optical device is 0.5 μm or more, and the difference (Rp-Rv) between the maximum profile peak height Rp and the maximum profile valley depth Rv is less than 3. The light-shading member for an optical device preferably has a substrate film and a light-shading layer. The light-shading layer is formed on at least one surface of the substrate film. Further, the light-shading layer has an average film thickness of 2 μm-35 μm.

2 Claims, 2 Drawing Sheets

(56) References Cited

U.S. PATENT DOCUMENTS

2012/0316265 A1* 12/2012 Kubota .................. G02B 1/111
                                                        523/456
2015/0146093 A1    5/2015 Lin
2018/0239066 A1*   8/2018 Tachibana ............ G02B 5/0221

FOREIGN PATENT DOCUMENTS

| JP | H1164703 A    | 3/1999  |
| JP | 2008281977 A  | 11/2008 |
| JP | 2011186438 A  | 9/2011  |
| JP | 2012194514 A  | 10/2012 |
| JP | 2015034983 A  | 2/2015  |
| WO | 2012132727 A1 | 10/2012 |
| WO | 2013018467 A1 | 2/2013  |
| WO | 2016186097 A1 | 11/2016 |
| WO | 2016186098 A1 | 11/2016 |
| WO | WO2015053274 A1 | 3/2017 |

OTHER PUBLICATIONS

Korean Office Action dated May 8, 2020, in counterpart Korean application 10-2019-7010076, English translation, 4 pages.

* cited by examiner

LIGHT-SHADING MATERIAL FOR OPTICAL DEVICE

TECHNICAL FIELD

The present invention relates to a Light-shading material for an optical device, and more particularly to a Light-shading material which applied to the inner wall surface, the flexible printed circuit board, the shutter, the iris (aperture), the gasket, or the like of an optical device, for example an optical property detector or the like, such as a camera, a projector and a video camera, a copying machine, a gloss meter, or the like.

BACKGROUND ART

Conventionally, a Light-shading material having anti-reflection performance has been provided on the inner walls and the flexible printed circuit boards or the like of the various optical devices (Patent Document 1). In addition, a Light-shading film is also used for the feather material (a material constituting a shutter) or the gasket or the like of an optical device, such as a camera, a projector, or a video camera (Patent Document 2).

EXISTING PRIOR ART DOCUMENTS

Patent Documents

Patent Document 1: Japan Patent Laid-Open No. 10-268105
Patent Document 2: Japan Patent Laid-Open No. 4-9802
Patent Document 3: Japan Patent Laid-Open No. 2008-225099

SUMMARY OF THE INVENTION

Problems to be Solved by the Present Invention

Usually, a matting agent is added to the above-mentioned Light-shading film or the like, and a Light-shading layer which roughens the surface is provided. In order to improve the Light-shading property of the Light-shading film, a thick film fixed layer provided on the Light-shading layer and between the base film and the Light-shading layer that is effective.

However, in recent years, as the development of miniaturization and thinning of optical devices, it is required a Light-shading film having thin and excellent Light-shading properties, a good hardness, and a good adhesion between the Light-shading layer and the base film. In order to solve such problems, a Light-shading film is disclosed in Patent Document 3, which comprising base films (substrates) and a Light-shading layer disposed on a surface of one of the substrates, the substrate is a synthetic resin film contains white pigment or has fine closed cells on the surface and the inside thereof, and has a light reflectance of 80% or more, the Light-shading layer contains a binder resin, a black pigment and a filler, and has a thickness of 15 μm or less, and in the thickness direction thereof, the Light-shading layer has a concentration of the black pigment in the vicinity of the surface in contact with the substrates is higher than a concentration of the black pigment in the vicinity of the face (surface) not in contact with the substrates, and the overall thickness is 60 μm or less. Further, it is described the Light-shading film also has excellent Light-shading properties, even if it is thin. Specifically, it is disclosed a Light-shading film in which the gloss of incident light with respect to an incident angle of 60° is 6% or less.

However, in Patent Document 3, since the concentration of the black pigment in the thickness direction changes, a complicated preparation process such as providing two Light-shading layers or more is required. In addition, in recent years, since the light source is miniaturized and the light amount is increased, the performance is improved, and therefore, it is required to have a more excellent anti-reflection performance (a Light-shading property).

Therefore, an object of the present invention is to provide a Light-shading member for an optical device, the Light-shading member can be manufactured by a simple process, and which has excellent reflection preventing performance and can be applied to an optical device which is small and thin.

Means of Solving Problems

The inventor of the present invention has conducted intensive studies and found that the above problems can be solved by controlling the difference between the maximum profile peak height Rp and the maximum profile valley depth Rv of the surface of the Light-shading member having a specific surface roughness or more, and the present invention has been completed. That is, the Light-shading material of the present invention is characterized in that based on JIS B0601: 2001, the arithmetical mean deviation of the assessed profile Ra of the surface is 0.5 μm or more, and the difference (Rp–Rv) between the maximum profile peak height Rp and the maximum profile valley depth Rv is less than 3.

The surface hardness of the Light-shading material of the present invention is preferably H or more.

Further, the Light-shading member of the present invention preferably has a base film and a Light-shading layer formed on at least one of the surfaces of the base film.

Further, the average thickness of the Light-shading layer is preferably 2 μm to 35 μm.

Effect of the Present Invention

The Light-shading member of the present invention can be produced by a simple preparation process, and has excellent anti-reflection properties, even in the case of thinning. In addition, since the Light-shading material of the present invention having a Light-shading layer has an excellent hardness and the adhesion between the Light-shading layer and the film substrate, it can have excellent anti-reflection properties for a long period of time even when applied to an optical device which is miniaturized or thinned.

DESCRIPTION OF THE PREFERRED EMBODIMENTS

Specific embodiments of the present invention will be described in detail below.

The Light-shading material of the present invention is characterized in that the based on JIS B0601: 2001, the arithmetical mean deviation of the assessed profile Ra of the surface is 0.5 μm or more, and the difference (Rp–Rv) between the maximum profile peak height Rp and the maximum profile valley depth Rv is less than 3.

By the arithmetic mean roughness Ra of the surface of the Light-shading material is 0.5 or more, and the difference (Rp–Rv) between the maximum profile peak height Rp and the maximum profile valley depth Rv is less than 3, the excellent anti-reflection performance can be exhibited even if it is thin. Specifically, by controlling the surface of the Light-shading material be within the above range, it is possible to obtain an excellent anti-reflection performance with a gloss of less than 3% at an incident angle of 60°.

The arithmetic mean roughness Ra of the surface of the Light-shading material is preferably 1.0 μm or more, and more preferably 2.0 μm or more.

The Rp–Rv value of the surface of the Light-shading material is preferably 2.0 or less, and more preferably 1.5 or less. On the other hand, as long as the arithmetic mean roughness Ra is 0.5 μm or more, the lower limit of Rp–Rv is not particularly limited.

The method of controlling the Ra and Rp–Rv values of the surface of the Light-shading material of the present invention is not particularly limited, and a method may be exemplified: (A) controlling the unevenness on the surface of the Light-shading layer through the particle size, particle size distribution, content of the filler (matting agent) added to the surface Light-shading layer, and a film thickness of the Light-shading layer, a production condition of the Light-shading layer or the like, (B) forming a concave and convex surface on the substrates of the Light-shading material, and (C) forming a concave and convex surface on the substrates of the Light-shading layer, and controlling the particle size or the like of the filler (matting agent) added to the surface Light-shading layer.

Detailed description will be respectively made based on the drawings.

Figure 1:
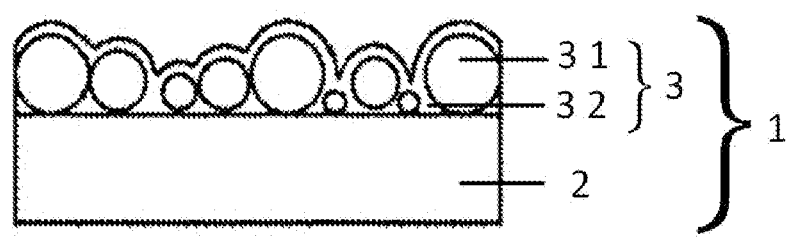
FIG. 1 is a cross-sectional schematic view showing the configuration of a Light-shading material according to an embodiment of the present invention.

First, the configuration of the Light-shading material 1 obtained by the method (A) will be described. As shown in FIG. 1, the surface of the flat base film 2 is covered with the Light-shading layer 3 containing the matting agent 31 and the matrix part 32. On the surface of the Light-shading layer 3, a concave and convex surface is formed by the matting agent 31. Here, the Ra and Rp–Rv values on the surface of the light-shading material 1 can be controlled by adjusting the particle size, the particle size distribution, the content of the matting agent 31 and the film thickness of the Light-shading layer 3. Further, it is also possible to control those values by adjusting the type of the solvent and the concentration of the solid component in the coating liquid preparing step, and the coating amount applied to the base film. Further, it is also possible to control those values by the coating film production condition, such as the coating method, the drying temperature, the drying time, and the air volume during drying or the like. By controlling the composition of the coating liquid and the coating film production conditions or the like, it is possible to prepare a Light-shading layer, having different Rp–Rv values with substantially the same film thickness or Ra.

Next, the configuration of the Light-shading material 1 obtained by the method (B) will be described.

Figure 2:
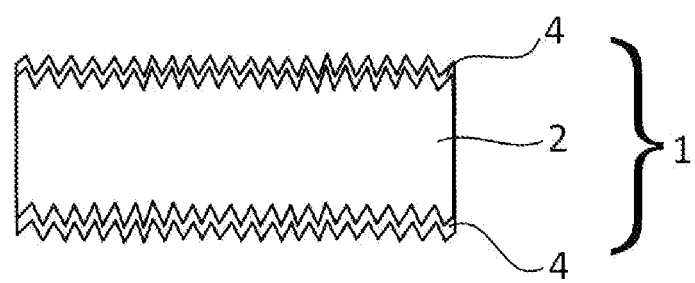
FIG. 2 is a cross-sectional schematic view showing the configuration of a Light-shading material according to another embodiment of the present invention.

As shown in FIG. 2, a concave and convex surface is formed on the base film 2. For the formation of the unevenness, for example, a sandblasting method can be used. And the Ra and Rp–Rv values can be controlled by controlling the particle diameter of the polishing agent and the ejection pressure or the like. In FIG. 2, by covering the thin film 4 on the base film 2 on which the unevenness is formed, it is possible to form a concave-convex shape that imitates the concave-convex shape of the surface of the base film 2 on the surface of the Light-shading member 1. Here, in the thin film 4 on the surface of the Light-shading material, the matting agent is not added, and the Ra and Rp–Rv values on the surface of the Light-shading material 1 are adjusted by the concave-convex shape of the base film 2 and the film thickness of the thin film 4.

If it is applied to a field where high hardness is not required, or when the base film has sufficient hardness, the base film 2 without the thin film 4 can be used as a Light-shading material. On the other hand, when it is used as a member that slides with another member or is in contact to a person's hand, by the film 4 having high hardness and excellent sliding characteristics is formed on the surface of the Light-shading material, whereby excellent Light-shading properties can be maintained for a long period of time.

In the method (C), as shown in (B), a concave and convex surface is formed on the base film, and as shown in (A), the surface of the Light-shading material is covered with a Light-shading layer containing a matting agent. In this configuration, the Ra and Rp–Rv values on the surface of the Light-shading material can be controlled by the concave-convex shape on the surface of the base film 2, the thickness of the Light-shading layer, the particle diameter, the particle size distribution, the content of the matting agent in the Light-shading layer and the production conditions of the Light-shading layer, or the like.

The surface hardness of the Light-shading material of the present invention is not particularly limited, but is preferably H or more. When the surface hardness of the Light-shading material is H or more, even the case which used as a sliding member or a member is in contact to a person's hand, abrasion of the surface of the Light-shading material can be reduced, and excellent Light-shading characteristics can be maintained for a long period of time. The surface hardness of the Light-shading material of the present invention is more preferably 2H or more. The above surface hardness is measured by a pencil scratch tester in accordance with JIS K5600, and evaluated by the JIS K5400 standard.

Further, in the Light-shading material of the present invention is preferably a degreased cotton with methyl ethyl ketone as the relative material, and the optical concentration difference before and after reciprocating sliding test is less than 1.5. Such a Light-shading material having excellent solvent resistance can be used as a Light-shading film having a high crosslinking density, because it is a tough film, it can maintain concave-convex shape for a long time, even under sliding conditions, and excellent shading characteristics can be exhibited. The above sliding test and measurement of optical density can be carried out by the following methods.

For the coating film surface, the degreased cotton containing methyl ethyl ketone is slid 20 times at a load of 250 g per 3 square centimeter ($cm^2$) according to 200 mm/second, the optical concentration before and after the test is measured by optical concentration meter, and the difference is calculated.

Further, when the Light-shading material of the present invention is used as a member that slides with another members, the dynamic friction factor of the surface of the Light-shading material is preferably 0.42 or less. Such a Light-shading material is excellent in sliding performance, and can maintain the concave-convex shape on the surface of the Light-shading material, even when used for a long period of time, that is, maintain the above Ra and Rp−Rv values. Thereby, an excellent antireflection performance (light shading property) can be maintained for a long period of time.

The dynamic friction factor of the Light-shading material of the present invention is preferably 0.35 or less, and more preferably 0.3 or less. Further, the dynamic friction factor can be measured by a friction and wear tester HEIDON or the like.

The Light-shading material of the present invention is preferably a configuration in which a Light-shading layer is formed on at least one of the surfaces of the base film. In the following description, the film without the matting agent, which is set to be formed by method (B) and covered on the surface of the substrate film, is also included in the light-shading layer.

The specific material constitution of the Light-shading material of the present invention will be described below.

(1) The Base Film

The base film used in the present invention is not particularly limited, and may be a transparent film or an opaque film. As a material of the base film, for example, polyolefins such as polyethylene, polypropylene, ethylene-propylene copolymers, copolymers of ethylene and alpha olefins with 4 or more carbon atoms, polyesters such as polyethylene terephthalate, polyamides such as nylon, ethylene-vinyl acetate copolymers, polyvinyl chloride, polyvinyl acetate and other general plastics, polycarbonate, polyimide and other engineering plastics can be used. Among these materials, from the viewpoint of high strength, higher economy and versatility, it is preferred to use biaxially stretched polyethylene terephthalate. By using a high Light-shading substance having an optical density of 2 or more, preferably 4 or more, in which a black coloring matter, such as carbon black or aniline black or the like is previously added to these materials, a more excellent Light-shading effect can be obtained.

The thickness of the substrate film is not particularly limited, and is preferably 12 to 188 μm, more preferably 12 to 75 μm. By setting the thickness of the base film within the above range, it is also applied to small or thin optical members.

When the methods (B) and (C) described above are used, the surface of the Light-shading material is subjected to matting processing in advance to form concave and convex parts. The matting processing method is not particularly limited, and a known method can be used. For example, a chemical etching method, a blasting method, an embossing method, a calendering method, a corona discharge method, a plasma discharge method, a chemical mat (extinction) method formed of a resin and a roughening agent, and the like. Among them, from the viewpoints of ease of control of shape, economy, workability and the like, it is preferable to use a blasting method, particularly a sand blasting method.

In the sand blasting method, the Ra and Rp−Rv values of the surface can be controlled by the particle size of the abrasive used, the injection pressure, and the like. Further, in the embossing method, the Ra and Rp−Rv values of the surface can be controlled by adjusting the shape or pressure of the embossing roll.

In addition, depending on the use of the Light-shading material, a Light-shading layer to be described later is not formed on the base film, the base film is formed with concave-convex parts on the surface by the method (B), but is used as a Light-shading material which exposes the surface of the concave-convex parts.

(2) The Anchor Layer

In order to improve the adhesion between the base film and the Light-shading layer, a anchor layer may be provided before the Light-shading layer is provided on at least one of the surfaces of the base film. As the anchor layer, a urea-based resin layer, a melamine-based resin layer, a urethane-based resin layer, a polyester-based resin or the like can be used. For example, the urethane-based resin layer can be obtained by applying a solution containing a polyisocyanate, an active hydrogen-containing compound such as a diamine or a diol to the surface of the base film, and curing it. Further, in the case of a urea-based resin or a melamine-based resin, it can be obtained by applying a solution containing a water-soluble urea-based resin or a water-soluble melamine-based resin to the surface of the substrate and curing it. The polyester-based resin can be obtained by applying a solution dissolved or diluted with an organic solvent (methyl ethyl ketone, toluene, etc.) to the surface of the substrate and drying it.

(3) The Light-Shading Layer

As described above, the Light-shading layer is formed on at least one of the surfaces of the base film, except for the case of the Light-shading material having a configuration in which the concave-convex parts formed on the surface of the base film is exposed by the method (B). The Light-shading layer includes a Light-shading layer containing a matting agent used in the above methods (A) and (C), and a Light-shading layer (high-hardness layer or film) having no matting agent used in the method (B).

The configuration of each of the Light-shading layers will be described below.

1) The Light-Shading Layer Containing Matting Agent

The constituent components of the Light-shading layer include a resin component, a matting agent, and a coloring/conductive agent.

The resin component is a binder for a matting agent and a coloring/conductive agent. The material of the resin component is not particularly limited, and any one of a thermoplastic resin and a thermosetting resin can be used. Specific examples of the thermosetting resin include a acrylic resin, a urethane resin, a phenol resin, a melamine resin, a urea resin, a diallyl phthalate resin, an unsaturated polyester resin, and an epoxy resin, alkyd resin, etc. Further, examples of the thermoplastic resin include a polyacrylic ester resin, a polyvinyl chloride resin, a butyral resin, and a styrene-butadiene copolymer resin, etc. From the viewpoints of heat resistance, moisture resistance, solvent resistance, and surface hardness, it is preferred to use a thermosetting resin. The thermosetting resin is particularly preferably an acrylic resin from the viewpoint of flexibility and toughness of the film.

By adding a curing agent as a constituent component of the Light-shading layer, crosslinking of the resin component can be promoted. As the curing agent, a urea compound having a functional group, a melamine compound, an isocyanate compound, an epoxy compound, an aziridine compound, an oxazoline compound, or the like can be used. Among them, an isocyanate compound is particularly preferred. The blending ratio of the curing agent is preferably 10 to 50 mass % based on 100 mass % of the resin component. By adding a curing agent in the above range, a Light-shading layer having a more suitable hardness can be obtained, and even when sliding with other members, the Ra and Rp−Rv values of the Light-shading layer can be maintained for a long period of time, and excellent Light-shading characteristics can be maintained.

In the case of using a curing agent, in order to promote the reaction, a reaction catalyst may be used in combination. The reaction catalyst may, for example, be ammonia or ammonium chloride or the like. The mixing ratio of the reaction catalyst is preferably in the range of 0.1 to 10 mass % based on 100 mass % of the curing agent.

As the matting agent, resin particles can be used, and inorganic particles can also be used. The resin particles may, for example, be a melamine resin, a benzoguanamine resin, a benzoguanamine/melamine/formalin polycondensate, an acrylic resin, a urethane resin, a styrene resin, a fluororesin, a silicone resin, or the like. On the other hand, examples of the inorganic particles include silica, alumina, calcium carbonate, barium sulfate, titanium oxide, or the like. These resin particles or inorganic particles may be used singly or in combination of two or more.

The average particle diameter, particle size distribution, and content of the matting agent vary depending on the thickness of the Light-shading layer to be set or the degree of the concave-convex shapes of the surface of the base film, and the desired Ra and Rp−Rv values are obtained on the surface of the Light-shading material by adjusting them. In the case of the method (A), for example, when a Light-shading layer having a film thickness of 2 to 35 μm is formed on a base film having a smooth surface, the average particle diameter of the matting agent is usually 1 to 40 μm, and when the film thickness of the Light-shading layer is 4 to 25 μm, the average particle diameter of the matting agent is preferably 5 to 20 μm.

In the case of the method (C), for example, when a Light-shading layer of 1 to 10 μm is formed on a base film having concave-convex shapes, the average particle diameter of the matting agent is preferably 2 to 15 μm, and when the film thickness of the Light-shading layer is 2 to 7 microns, the average particle size of the matting agent is preferably 2 to 10 microns.

The particle size distribution of the matting agent differs depending on the combination of the film thickness of the Light-shading layer and the size of the selected matting agent, and cannot be generalized, but is preferably as shaRp as possible. Further, Ra and Rp−Rv values can be adjusted by using a plurality of matting agents having different average particle diameters and particle size distributions.

The amount of the matting agent to be added depends on the average particle diameter, the particle size distribution of the matting agent, and the thickness of the Light-shading layer, in the method (A), it is preferably 20 mass % to 80 mass % based on 100 mass % of the entire Light-shading agent. In addition, in the case of the method (C), it is preferably 1 mass % to 40 mass %.

By controlling the surface shape of the base film, the average particle diameter, the particle size distribution and the content of the matting agent, and the film thickness of the Light-shading layer and the like, the Ra value of the surface of the Light-shading layer is adjusted to 0.5 μm or more, and the Rp−Rv value is adjusted to less than 3, excellent Light-shading properties can be exhibited even if it is thin. Specifically, it has been confirmed that by controlling the Ra value and the Rp−Rv value of the surface of the Light-shading layer as described above, the gloss of the incident light of an incident angle of 60° is 3% or less.

Further, the shape of the matting agent is not particularly limited, but a spherical matting agent is preferable in consideration of flow characteristics and coating properties of the coating liquid, sliding properties of the obtained Light-shading layer, and the like. Further, in order to suppress reflection of light, the matting agent may be colored black by an organic or inorganic dye as needed. Specific examples of the coloring agent include carbon black, aniline black, and carbon nanotubes and the like. When a matting agent dyed with carbon black is used, and carbon black or the like is added to the Light-shading layer that as a coloring/conductive agent, more excellent Light-shading properties can be obtained.

As the coloring/conductive agent, carbon black or the like is usually used. Since the Light-shading layer is dyed by the addition of the coloring/conductive agent, the Light-shading property is improved, and a good charging prevention effect can be obtained.

The average particle diameter of the coloring/conductive agent is preferably 1 nm to 1000 nm, more preferably 5 nm to 500 nm. When the particle diameter of the coloring/conductive agent is within the above range, more excellent Light-shading properties can be obtained.

Further, the content of the coloring/conductive agent is preferably 9 mass % to 38 mass % based on 100 mass % of the entire Light-shading layer. When the content of the coloring/conductive agent is within the above range, more excellent Light-shading properties can be obtained.

In the present invention, as a constituent component of the Light-shading layer, a leveling agent, a thickener, a pH adjuster, a lubricant, a dispersant, an antifoaming agent, or the like may be further added as needed.

As the lubricant, polytetrafluoroethylene (PTFE) particles of a solid lubricant can be used, and in addition, a polyethylene wax, silicone particles or the like can also be used.

The above-mentioned constituent components are added to an organic solvent or water, and a uniform coating liquid can be prepared by mixing and stirring. The organic solvent may, for example, be methyl ethyl ketone, toluene, propylene glycol methyl ether acetate, ethyl acetate, butyl acetate, methanol, ethanol, isopropanol, butanol, or the like.

The obtained coating liquid is directly applied onto the surface of the base film or applied to a previously formed anchor layer, and dried to form a Light-shading layer. The coating method is not particularly limited, and a roll coating method, a doctor blade method, or the like can be used. Here, the Ra value and the Rp−Rv value can be controlled in accordance with the concentration and amount of the coating liquid, the coating film production conditions, such as the air volume during drying.

The thickness of the Light-shading layer of the present invention is preferably 2 μm to 35 μm. Particularly in the case of the matting agent, the thickness of the Light-shading layer is preferably 2 μm to 30 μm, more preferably 4 μm to 25 μm in the method (A). In addition, in the case of the method (C), the thickness of the Light-shading layer is preferably 1 μm to 10 μm, more preferably 2 μm to 7 μm.

The thickness of the Light-shading layer is set within the above range, and the desired Light-shading property and sliding property can be obtained. Further, the thickness of the Light-shading layer containing the matting agent is the height that from the surface of the film substrate to the stromal portion which does not protrude from the matting agent of the Light-shading layer. The thickness of the above Light-shading layer is measured based on JISP8118.

Example

The invention is illustrated in detail by the following examples, but the invention is not limited by these examples.

Further, in the examples, "%" and "parts" mean % by mass or parts by mass, unless otherwise specified.

(Composition of the Light-Shading Layer)
(a) Resin
(a1) Acrylic resin: ACRYDIC A814, manufactured by DIC CoRporation
(a2) Polyurethane resin: HYDRAN AP-40, manufactured by DIC CoRporation
(b) Curing Agent
TDI type polyisocyanate: CORONATE L, manufactured by Tosoh CoRporation
(c) coloring/conductive agent
(c1) Carbon black: NX-592 black, manufactured by Dainichiseika Color & Chemicals Mfg Co., Ltd.
(c2) Carbon black: GPIblack #4613, manufactured by Mikuni-Color Ltd.
(d) Matting Agent
(d1) Acrylic filler: MX-500 (average particle size: 5 μm) manufactured by Soken Chemical & Engineering Co., Ltd.
(d2) Acrylic filler: MX-1000 (average particle size: 10 μm) manufactured by Soken Chemical & Engineering Co., Ltd.
(d3) Acrylic filler: MX-1500H (average particle size: 15 μm) manufactured by Soken Chemical & Engineering Co., Ltd.
(d4) Acrylic filler: MX-2000 (average particle size: 20 μm) manufactured by Soken Chemical & Engineering Co., Ltd.
(d5) Acrylic filler: MX-300 (average particle size: 3 μm) manufactured by Soken Chemical & Engineering Co., Ltd.
(e) Lubricant
Highly crystalline polyethylene wax: HIGHTECH E-3500 manufactured by Toho Chemical Industry Co., Ltd.

Examples 1 to 6, Comparative Examples 1 to 4

The above resin, curing agent, coloring/conductive agent, and matting agent are added to a solvent according to the ratio (mass) shown in Table 1, and the mixture is stirred and mixed to obtain a coating liquid. Here, methyl ethyl ketone and toluene are used as a solvent.

A polyethylene film (Lumirror X30, manufactured by Toray Industries, Inc.) having a thickness of 50 μm is used as a base film, and a coating liquid is applied to one surface thereof, followed by drying at 100° C. for 2 minutes to form a Light-shading layer. Further, in Examples 1 to 6 and Comparative Examples 1 to 4, the types and contents of the resin, the curing agent, the coloring/conductive agent are all the same, and only the type of the matting agent is changed to prepare a coating liquid. Further, in Example 2 and Comparative Example 1, Examples 3 and 4, and Comparative Example 2, Examples 5 and 6, and Comparative Examples 3 and 4, the same coating liquid is used, and the \VET thickness in the coating process and the air volume of the dryer during the drying process are changed to obtain a Light-shading layer with different shapes. Specifically, the number of rotations of the inverter that determines the air volume of the dryer is 1000 Rpm in Examples 2, 3 and 5 and Comparative Example 4, and is 600 Rpm in Comparative Examples 1 to 3, and the air volume is relaxed and dried, and in Examples 1, 4, and 6 is 1400 Rpm, to enhance the air volume for drying.

The average thickness of the film, the Ra value, the Rp–Rv value of the obtained Light-shading material and the Light-shading layer, and the gloss of the incident light with respect to the incident angle of 60 degrees are measured, and the results are shown in Table 1.

TABLE 1

| | | | Example 1 | Example 2 | Comparative Example 1 | Example 3 | Example 4 | Comparative Example 2 | Example 5 | Example 6 | Comparative Example 3 | Comparative Example 4 |
|---|---|---|---|---|---|---|---|---|---|---|---|---|
| Light-shading layer | Resin | (a1) Acrylic resin | 27.1 | 27.1 | 27.1 | 27.1 | 27.1 | 27.1 | 27.1 | 27.1 | 27.1 | 27.1 |
| | Curing agent | (b) TDI type polyisocyanate | 13.6 | 13.6 | 13.6 | 13.6 | 13.6 | 13.6 | 13.6 | 13.6 | 13.6 | 13.6 |
| | Dye/Conductive Agent | (c1) Carbon Black | 18.9 | 18.9 | 18.9 | 18.9 | 18.9 | 18.9 | 18.9 | 18.9 | 18.9 | 18.9 |
| | Matting agent | (d1) acrylic filler (5 μm) | 39.9 | — | — | — | — | — | — | — | — | — |
| | | (d2) Acrylic filler (10 μm) | — | 39.9 | 39.9 | — | — | — | — | — | — | — |
| | | (d3) Acrylic filler (15 μm) | — | — | — | 39.9 | 39.9 | 39.9 | — | — | — | — |
| | | (d4) Acrylic filler (20 μm) | — | — | — | — | — | — | 39.9 | 39.9 | 39.9 | 39.9 |
| Measurement and evaluation | | Average film thickness of the Light-shading layer (μm) | 6 | 13 | 12 | 18 | 22 | 17 | 23 | 24 | 21 | 22 |
| | | Ra (μm) | 0.69 | 2.09 | 2.40 | 2.84 | 2.73 | 3.54 | 4.10 | 3.70 | 4.52 | 4.01 |
| | | Rp-Rv | 0.9 | 2.4 | 3.2 | 1.8 | 0.02 | 5.9 | 1.1 | 0.5 | 8.7 | 4.6 |
| | | Gloss (%) (incident angle 60°) | 1.0 | 2.5 | 3.9 | 1.6 | 0.4 | 4.2 | 1.4 | 0.7 | 8.3 | 3.3 |

The measurement of the gloss of the incident light at an incident angle of 60° is measured in accordance with JIS Z8741, and the specular gloss at an incident angle of 60° is measured.

Examples 7, 8, 9 and Comparative Example 5

Both sides of black polyethylene terephthalate (Lumirror X30) having a thickness of 50 μm are subjected to sand blasting and matting to form surface concave-convex shapes. A test sample in which no coating film is applied to the surface in the state of sand blasting and matting is used as Example 7.

Next, the resin, the curing agent, the coloring/conductive agent, the matting agent, and the lubricant are added to the solvent in the mixing ratio (weight) shown in Table 2, and the mixture is stirred and mixed to obtain a coating liquid. Here, as a solvent, a mixed solution of water and isopropyl alcohol which is used. The obtained coating liquid is applied to each surface of the black polyethylene terephthalate base film which is subjected to sand blasting and matting on both sides, and then dried at 110° C. for 2 minutes to form a Light-shading layer (Example 8, Example 9 and Comparative Example 5). Further, in Example 8, the Light-shading layer obtained by the method (B) does not contain a matting agent, and Example 9 is provided with the light-shading layer and obtained by the method (C), the light-shading layer containing the matting agent that is provided on the substrate having concave-convex shapes on the surface. Further, as a comparison, a test sample for forming a Light-shading layer (Comparative Example 5) is produced in the same manner as in Example 8, except that the matte treatment time at the time of blasting and matting is shortened, and the surface roughness of the polyethylene terephthalate is changed.

The measurement results of the Ra value, Rp-Rv, the gloss of incident light at an incident angle of 60° of the obtained Light-shading material and the Light-shading layer are shown in Table 2. Further, in Example 8, Example 9 and Comparative Example 5, the measurement results of the average film thickness of the Light-shading layer are also shown in Table 2.

same, the Ra value and the Rp-Rv of the surface are controlled by changing the film thickness of the Light-shading layer and the manufacturing conditions. Here, the examples and comparative examples using the same coating liquid are compared, and it is found that the lower the Rp-Rv value, the lower the gloss of the incident light with respect to the incident angle of 60°, and the Light-shading property is improved.

Figure 3:
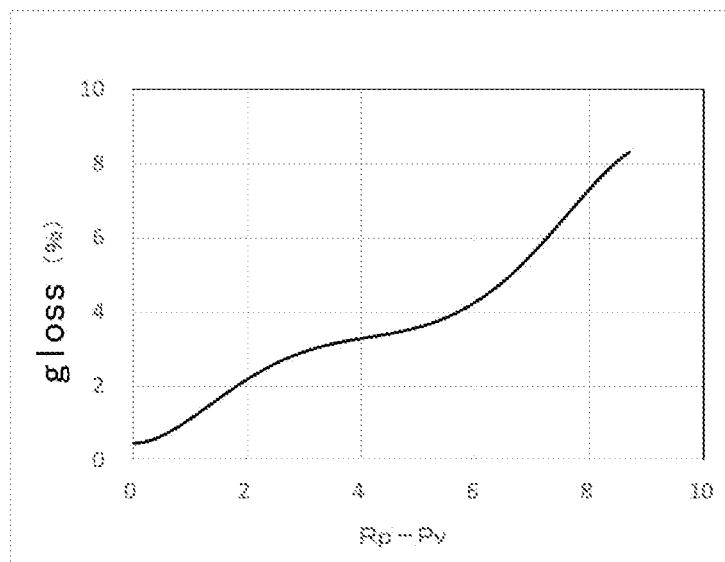
FIG. 3 is a graph showing an example of the relationship between the Rp-Rv value of the surface of the Light-shading material and the gloss of incident light with respect to an incident angle of 60°.

FIG. 3 shows the results of the relationship between the Rp-Rv value of the surface of the Light-shading material and the gloss of incident light having an incident angle of 60°. As this result, it is easy to know that the lower the Rp-Rv value of the surface of the Light-shading material, the lower the gloss of the incident light having an incident angle of 60°. Further, it is understood that when the Rp-Rv value is around 3, the incident light having an incident angle of 60° has a gloss of less than 3, and has excellent Light-shading properties. When the Rp-Rv value exceeds 3, the gloss of incident light having an incident angle of 60° rises shaRply, and the Light-shading property is lowered. Therefore, it is considered to be important to set the Rp-Rv value of the surface of the Light-shading material to less than 3. Here, if the Ra value is 0.5 μm or more, when the Rp-Rv value is less than 3, the excellent Light-shading properties can be exhibited.

Further, it is not described in the tables that the surface hardness of the test samples of the examples and the comparative examples shown in Table 1 are higher than H. When the result of measuring the surface hardness of the Light-shading material of the examples of the Patent Document 1 is B, it is confirmed that the high-hardness of the Light-shading layer is also achieved by this example.

As shown in Table 2, in Example 7 in which the film substrate on which the concave-convex shapes are formed is directly used as the Light-shading material, the Ra value is 0.68 μm, the Rp-Rv value is 0.9, and the gloss of incident light having an incident angle of 60° is 2.4%. In Example 8 in which the surface is covered with a Light-shading layer containing no matting agent, the Ra value is 0.76 μm, the Rp-Rv value is 1.2, and the initial gloss of incident light

TABLE 2

|  |  |  | Example 7 | Example 8 | Example 9 | Comparative Example 5 |
|---|---|---|---|---|---|---|
| Light-shading layer | Resin | (a2) Polyurethane resin | — | 55.3 | 43.5 | 55.3 |
|  | Curing agent | (b) TDI type polyisocyanate | — | 7.5 | 5.9 | 7.5 |
|  | Dye/Conductive Agent | (c2) Carbon Black | — | 7 | 5.5 | 7 |
|  | Matting Agent | (d5) acrylic filler (3 μm) | — | — | 21.3 | — |
|  | Lubricant | (e) Highly crystalline polyethylene wax | — | 30.2 | 23.8 | 30.2 |
| Measurement . Evaluation results | Average film thickness of the Light-shading layer (μm) |  | — | 1 | 2 | 1 |
|  | Ra (μm) |  | 0.68 | 0.76 | 0.58 | 0.41 |
|  | Rp-Rv |  | 0.9 | 1.2 | 1.1 | 0.7 |
|  | Gloss (%) (incident angle 60°) |  | 2.4 | 2 | 2.9 | 6.9 |

As is clear from Table 1, the film thickness of the Light-shading layer, the Ra value of the surface and the Rp-Rv value can be changed by using different kinds of matting agents. Further, in Comparative Example 2 and Comparative Example 1, Examples 3 and 4, and Comparative Example 2, Examples 5 and 6, and Comparative Examples 3 and 4, it is confirmed that the same coating liquid is used, and even if the types of matting agents are the having an incident angle of 60° is 2%. Further, in Example 9 in which the surface of the film substrate on which the concave-convex shapes are formed is covered with the Light-shading layer containing the matting agent, the Ra value is 0.58 μm, the Rp-Rv value is 1.1, and the initial gloss of incident light having an incident angle of 60° is 2.9%. On the other hand, in Comparative Example 5 in which the Ra value is 0.41 and the surface concave-convex shapes are small, the Rp−Rv value is 0.7, and the gloss of incident light having an incident angle of 60° is 6.9%. From this, it is confirmed that in order to obtain excellent light-shading properties, the Ra value must be equal to or greater than a predetermined value, and the Rp−Rv value controlling is very low. Specifically, irrespective of the configuration of the Light-shading material, when the Ra value is controlled to be 0.5 μm or more and the Rp−Rv value is less than 3, the gloss is 3% or less, and excellent Light-shading characteristics can be obtained. Further, although not shown in the tables, in any of the configurations, even if the Ra value is 0.5 μm or more and the Rp−Rv value is as large as 3 or more, the good Light-shading properties cannot be obtained.

From the above results, when the arithmetic average roughness Ra of the surface measured according to JIS B0601:2001 is 0.5 μm or more, and the difference (Rp−Rv) between the maximum peak Rp and the maximum profile valley depth Rv is less than 3, the excellent properties of the Light-shading member of the present invention is confirmed.

INDUSTRIAL PRACTICALITY

The Light-shading material of the present invention can be applied to the inner wall surface, the flexible printed circuit board, the shutter, the iris (aperture), the gasket, or the like of an optical device, particularly a camera, a projector and a video camera, a copying machine, an optical property detector (a gloss meter, or the like). In addition, it can also be used for watches, toys, and the like.

DESCRIPTION OF THE REFERENCE NUMERALS

1: the Light-shading material
2: the base film
3: the Light-shading layer
31: matting agent
32: stromal portion
4: the Light-shading layer (film)

The invention claimed is:

1. A light shading material for optical devices, which has a substrate film and a light shading layer, characterized in that the light shading layer is formed on at least one surface of the substrate film, the light shading layer contains a resin component and a matting agent, an arithmetical mean roughness Ra of an outer surface of the light shading layer is 2 μm or more, and a difference (Rp−Rv) between a maximum profile peak height Rp and a maximum profile valley depth Rv is less than 3 μm as determined in accordance with JIS B0601: 2001, and for the outer surface of the light shading layer, a degreased cotton containing methyl ethyl ketone is slid 20 times at a load of 250 g per 3 square centimeter (cm$^2$) according to 200 mm/second, a difference of an optical concentration after a test is less than 1.5.

2. The light shading material for optical devices according to claim 1, characterized in that the light shading layer has an average film thickness of 2 μm-35 μm.

* * * * *